UNITED STATES PATENT OFFICE.

SIEGFRIED HAMMACHER, OF BERLIN, GERMANY.

ACTIVE MATERIAL FOR ELECTRODES OF ELECTRIC ACCUMULATORS.

SPECIFICATION forming part of Letters Patent No. 588,905, dated August 24, 1897.

Application filed August 28, 1896. Serial No. 604,215. (Specimens.)

*To all whom it may concern:*

Be it known that I, SIEGFRIED HAMMACHER, a subject of the German Emperor, residing at Berlin, Germany, have invented an Improvement in the Manufacture of an Improved Active Material for the Plates or Electrodes of Electric Accummulators; and I do hereby declare the following to be a full, clear, and exact description of the invention.

My invention has relation to electric accumulators or storage batteries, and more particularly to the electrodes thereof and the mode of producing the active material.

It has heretofore been proposed to obtain an active material from lead oxids by the admixture therewith of a solution of the residues resulting from the distillation of coal-tar in alcohol or petroleum ether or similar solvents in such proportions as to result in a more or less plastic mass, which is then formed into plates and the solvent evaporated. These plates are then dipped into sulfuric acid. It is obvious that there is in this mode of procedure a mere mechanical admixture, the residue of tar distillation serving simply as a binding material that mechanically binds or cements together the particles of lead oxid. Electrodes thus made are objectionable, because the binding material has an undesirable effect upon the conductivity of the plate. It has also been proposed to obtain an active material by the admixture of lead oxid with butyric-acid esters, saponification taking place when the mixture is heated, while in "forming" hydrocarbons carbonic acid, carbonic oxid, &c., and a considerable proportion of resin is formed, the latter acting likewise as a binding material to mechanically bind or cement together the particles of oxid. Yet another process has been proposed in that a portion of the lead oxid is first converted into lead glycerate as an intermediate product, so that in the process of forming it is necessary to add potassium permanganate to the electrolyte for the purpose of breaking up the glycerins.

The object of my invention is to avoid the use of a so-called "binding" material, whereby the lead-oxid particles are mechanically bound or cemented together, and this I attain by reacting upon a member of the pyridin series with lead oxid in the presence of water, which results in a chemical combination, and a mass is obtained which in drying sets or hardens and is sufficiently solid to be used as electrodes after forming, such electrodes possessing even a greater degree of cohesion than the electrodes hitherto used, while their conductivity is not impaired and the time required in forming is reduced to an extraordinary degree, generally from one-half to one and one-half days, whereby not only a great deal of time, but also much current is saved.

I am unable at the present time to positively determine the reaction or reactions that take place when a lead oxid is caused to react upon a member of the pyridin series (or vice versa) in presence of water. It is, however, well known that strong bases act as an acid relatively to lead oxid, and in accordance therewith the oxid is soluble in soda, potash, and other lyes, combinations being formed the constituents of which may be expressed by the formulæ $Pb(OK)_2$, $Pb(ONa)_2$, &c. It is therefore admissible that oxid of lead also acts as an acid relatively to or upon the highly-basic pyridins and that a chemical combination ensues from the reaction. This seems to be corroborated by the fact that when a lead oxid is caused to react upon an excess of pyridin either at a normal or a higher temperature scarcely a trace of lead can be found in solution. Hence a chemical combination must take place and the chemical compound must be an insoluble one. On the other hand, when a lead oxid is caused to react upon pyridin in presence of water hydroxid of lead seems to be formed, which latter combines still more readily with the pyridin member. This is found to be the case, as but traces of lead can be found when the dried compound is boiled in water. This fact has been fully established by experiments made with nitrate and chlorid of lead, which when treated with a small quantity of pyridin yield a white precipitate, which after filtration and washing with water drying and then treating with an aqueous solution of pyridin in presence of heat enters largely in solution, and the hot solution is rich in lead, which upon cooling results in a white precipitate, which is to all appearances a chemical combination of pyridin and lead hydroxid.

This has been proven by treating the hydroxid itself with a boiling aqueous pyridin solution, a not inconsiderable quantity of lead being formed in solution, and from the filtrate a white precipitate is obtained, consisting of pyridin lead hydroxid, which upon heating is again dissolved. The same results were obtained with peroxid of lead, which, as is also known, acts as an acid upon strong bases, resulting in the formation of plumbates, and this is the case when this oxid is treated with pyridin and forms what may perhaps be termed a "pyridin" plumbate, which is somewhat analogous to potassium plumbate. It may therefore be assumed that the setting or hardening of the lead oxid when treated as described is based upon the formation of a chemical combination between the oxid and the pyridin member, probably with the hydroxid under reduction of the peroxid when minium is used, while it is likely that the oxidation products of the pyridin member also play an important role in the reactions. It is furthermore probable that the homologue bases contained in impure pyridin or when these bases themselves are used they are oxidized into pyridin carbonic acid that enters into chemical combination with the lead oxid.

In view of what has been said it is obvious that in the production of the active material in accordance with this invention it is simply necessary to form a plastic mass with a lead oxid, as minium, red lead, or litharge, a member of the pyridin series or group, as pyridin, picolin, or lutidin, and water, from which the electrodes can be made in any well-known or desirable manner and of the required or desired form.

Upon drying the mass sets or hardens into a cohesive body whose conductivity is not impaired and which may then be "formed" as usual, the material remaining perfectly solid under this treatment.

Any one of the members of the pyridin group can be used in the process, and so can impure pyridin be used—such, for example, as is found in bone or animal oils—and these are preferably used in the form of aqueous solutions.

Electrodes made as described possess distinctive features relatively to those heretofore produced by mere mechanical cohesion or cementation in that their conductivity is not impaired, in that they are homogeneous, by reason of the greater cohesion of the constituents, and in that their capacity is very high, as high as one hundred ampere-hours per kilogram of material, while the cost of production is extraordinarily low as compared with the cost of production of the material usually employed.

Having thus described my invention, what I claim as new therein, and desire to secure by Letters Patent, is—

1. The herein-described active material containing a compound of lead oxid and a member of the pyridin series, substantially as set forth.

2. The herein-described active material containing a compound of hydroxid of lead and a member of the pyridin series, substantially as set forth.

3. The process of producing the herein-described active material by reacting with a lead oxid upon a member of the pyridin series in presence of water, substantially as set forth.

4. In the process of producing the herein-described active material, reacting with a lead oxid upon a member of the pyridin series in presence of water, by admixture and conversion of the materials into a plastic mass, reducing the latter to the desired form for use as electrodes, and, after drying forming the same in the usual manner, substantially as set forth.

In testimony that I claim the foregoing as my invention I have signed my name in presence of two subscribing witnesses.

SIEGFRIED HAMMACHER.

Witnesses:
W. HAUPT,
ED. WURTEMBERG.